Fig.1

Dec. 31, 1946.  D. G. SMELLIE  2,413,587
SUCTION CLEANER
Filed April 26, 1943  4 Sheets-Sheet 2

INVENTOR.
Donald G. Smellie
BY
Harry S. Dumars

Dec. 31, 1946.   D. G. SMELLIE   2,413,587
SUCTION CLEANER
Filed April 26, 1943   4 Sheets-Sheet 3

INVENTOR.
Donald G. Smellie
BY
Harry S. Dumass

Patented Dec. 31, 1946

2,413,587

UNITED STATES PATENT OFFICE 2,413,587

SUCTION CLEANER

Donald G. Smellie, Canton, Ohio, assignor to The Hoover Company, North Canton, Ohio, a corporation of Ohio Application April 26, 1943, Serial No. 484,514

15 Claims. (Cl. 15—16)

The present invention relates to suction cleaners in general and more particularly to a new and novel cleaner construction in which there is no cleaner bag or filter to be removed and cleaned by the operator. More particularly, the invention comprises an improved suction cleaner construction in which a plurality of dirt-separating units in series remove all the foreign material from the dirt-carrying air passing through the cleaner, the final dirt-separator being provided with cleaning means which remove the collected material therefrom and return it to an initial separator which is provided with a removable dirt-receptacle. It is an added feature of the invention that the cleaning of the final filter is accomplished automatically.

Certain constructional features disclosed herein are also disclosed and claimed in the co-filed and co-pending application of Louis K. Acheson, Serial No. 484,510, assigned to the assignee of the present application. These features include the general cleaner arrangement and the mounting and driving means of the filter-cleaning nozzle. The present invention is viewed as an improvement of the broader invention of the Acheson application.

It is an object of the present invention to provide a new and improved suction cleaner. It is another object of the invention to provide a suction cleaner having new and improved dirt-separating means. A further object of the invention is to provide a suction cleaner which incorporates a new and novel arrangement of dirt-separating means in combination with automatic means to remove the collected foreign material from certain of said separating means and to transport them to an operator-removable container. A still further object of the invention is to provide a suction cleaner in which the dirt-laden air stream passes through an initial separator, through suction-creating means, and through a final separator, automatic means being provided to remove the collected foreign material from the final separator and to return it to the initial separator when determined by the machine itself to be necessary. Still another object of the invention is to provide a suction cleaner incorporating an initial dirt separator and a final dirt filter in combination with automatic means to remove the collected foreign material from the dirt filter and to convey it directly to the initial separator from which it can be removed by the operator. A still further object of the invention is to provide a suction cleaner having an initial dirt separator and a final dirt filter between which is positioned the suction-creating means of the cleaner, in combination with filter-cleaning means which are automatically operative to remove the collected foreign material from the final filter and to transmit it directly to the initial separator under predetermined conditions. A further object of the invention is to provide a suction cleaner including suction-creating means and dirt-separating means, in combination with filter-cleaning means which are operated by the driving means for the suction-creating means and which are placed in operation automatically under predetermined cleaner conditions. Still another object of the invention is to provide a suction cleaner which incorporates an initial dirt separator and a final dirt separator in combination with means automatically to clean the final dirt-separator under predetermined operating conditions. A still further object of the invention is to provide a suction cleaner incorporating an initial dirt separator and a final dirt separator in combination with means to remove the collected foreign material from the final dirt separator and to return it to the initial separator upon determined variations in nozzle suction being effected. Still another object of the invention is to provide a suction cleaner incorporating filter-cleaning means which are automatically placed into operation. These and other more specific objects will appear upon reading the following specification and claims and upon considering in connection therewith the attached drawings to which they relate.

Referring now to the drawings in which preferred embodiments of the present invention are disclosed.

The modern suction cleaner has materially lessened the burden of home cleaning through its ability to remove from rugs, carpets, articles of furniture, drapes, etc., dirt and foreign material which inevitably collects thereon. The cleaning operation itself is today not very objectionable to the housewife, but there remains one task which is objectionable and which must be undertaken in order that the cleaner operate effectively. That task comprises the cleaning of the dirt-filtering or dirt-separating means of the cleaner.

The usual cleaner embodies a dust bag through which the dirt-laden air is exhausted and which performs the function of removing the dirt from the air by permitting the latter to pass through its interstices. Suction cleaners have in the past been built incorporating mechanical separating means such as whirl chambers and other types of centrifugal separators. These have embodied removable dirt pans, drawers, containers, etc., which are easily cleaned requiring only a dumping operation. The objection to these mechanical separators, however, is that they fail to remove a small fraction or percentage of the foreign material which passes through the cleaner. While in terms of percentage this escaped foreign matter is not important it is important in terms of user objection in that it comprises a very fine material which floats in the air and which is noticeable and objectionable to the user as a dust smell. As a result of this objection, suction cleaners embodying mechanical dirt separator means alone have not in the past been very successful.

In order to overcome this inherent difficulty in the mechanical separator type cleaner the Bible Patent 2,247,472 discloses a combination of mechanical dirt separator and final filter. In the Bible construction substantially all of the dirt is removed by the initial separator, the cleaned air being drawn therefrom by the suction-creating means of the cleaner which in turn exhausts it through a final filter preferably formed of an air-permeable fabric or functionally similar material. Such a machine can accomplish removal of all the dirt and is no more objectionable than is the usual bag type cleaner. Mr. Bible realized that in time the escaped foreign material from his initial separator would build up on his final filter and increase the resistance to the flow of air therethrough. This would result in the back pressure of his cleaner increasing which in turn would reduce the flow of air through the machine and so the cleaning effectiveness of the entire cleaner. To eliminate this objectionable feature the Bible patent construction provided a manually operable cleaning nozzle which, when manually connected to the dusting tool hose which usually carried the usual cleaning nozzle at its end, enabled the operator to clean the filter by a few simple operations. The dirt removed from the final filter in the Bible cleaner was returned to the initial separator where it could be removed from the air stream. That such removal took place upon the second passage of the dirt through the separator was due to an agglomerating effect which had taken place in the collection of the dirt on the final filter.

In the suction cleaner construction in accordance with the present invention, the basic principle of the Bible invention has been improved in that fully automatic means are provided to place the filter-cleaning mechanism into operation when required by the collection of foreign material on the final filter. An undue collection of foreign material upon that filter results in an increased back pressure in the machine and, in accordance with the first embodiment of the invention, this increased back pressure automatically results in the connection of the filter-cleaning nozzle to the intake of the cleaner and the mechanical connection of that nozzle to the driving motor resulting in its actuation. The filter-cleaning operation continues until the back pressure has decreased to a predetermined point at which the operation is automatically discontinued. In the second preferred embodiment of the invention the control of the operation is by the pressure on the suction side of the cleaner rather than on the exhaust side.

Returning now to the drawings, and to Figures 1 to 9 inclusive in particular, the first preferred embodiment of the invention is illustrated and is seen in Figure 1 in particular to comprise a main preferably cylindrical housing 1 which seats upon a supporting base 2, being removable therefrom in any suitable manner. The top of housing 1 is closed by the motor hood 3 which is provided with an inwardly extending and supporting wall 4 adapted to support a motor later to be described. At its lower end the main housing 1 is provided with interiorly extending rim 5 which seats and seals upon the upper peripheral edges of a dirt container or pan 7 which is positioned within the base 2. A vertical cylindrical casing 8 rises from the flanged ring 5, to which it is permanently connected, and is divided by a centrally apertured transverse wall 9 into a whirl chamber 11 and a fan chamber 12. A depending inlet 13 from fan chamber 12 extends down past the mid-portion of whirl chamber 11 and vertically spaced spiders 14 carry a depending supporting rod 16 at the lower end of which is supported, by means of a nut 17, a circular plate 18 which is positioned just above the dirt pan 7 and which has a diameter somewhat smaller than the diameter of casing 8. A strainer 19 is provided upon the supporting rod 16 immediately below the lower spider 14 to prevent the entrance of foreign material of appreciable size into the fan chamber.

Whirl chamber 11 is interiorly connected through a valve chamber 21 to the inlet port 22 which extends inwardly through the outer enclosing main casing 1 and at its outer end is adapted to seat a suitable dusting tool hose 6 of the usual and well known type which carries a cleaning nozzle 10 at its outer end. A vertically extending valve 23 is positioned within the valve chamber 21 being pivoted for movement between a port-closing position, as illustrated in dotted lines in Figure 6, and a second closing position as illustrated in the full lines in the same figure, through being fixed upon a shaft 24.

A stationary deflector 25 positioned centrally within the fan chamber 12 divides the latter into a first stage and a second stage which are connected by the deflector port 26. A rotary centrifugal fan 27 is positioned within each stage of the fan chamber, the second stage being provided with a plurality of exhaust ports 28 to exhaust the air into the space immediately around the upper end of the cylindrical casing 8.

Within the motor hood 3 is positioned a driving motor 29 the enclosing cylindrical wall of which is provided with a plurality of apertures 31 both above and below the transverse wall 4 by which it is centrally supported. It is the shaft 32 of this motor which extends vertically down and into the fan chamber 12 to carry the fans 27.

The space immediately around the upper end of the cylindrical casing 8 and thereabove comprises a filter chamber 33, the cylindrical side wall of which is formed by the air permeable filter 34 which is spaced inwardly from the enclosing main casing 1. The lower end of the filter chamber 33 is closed by the flanged collar 36 which seals to the exterior of the cylindrical casing 8 at its inner periphery while the upper end of the chamber 33 is formed by the closure plate 37. The latter is deformed to seal centrally upon the lower end of the motor casing 29, its outer edge being supported in spaced relationship to casing 1 by a plurality of spiders 38 which may be integrally formed. The upper edge of filter 34 is secured to a circular shoulder formed on plate 37. The filter 34 of filter chamber 33 is seen to be spaced within the enclosing casing 1 and the space between the filter chamber and casing 1 is indicated by the reference character 39 and is called the discharge chamber. Air which has passed through the filter 34, having previously been exhausted by the fan unit, can escape from the discharge chamber 39 only at the upper end thereof and around the plate 37. Above the plate 37 the apertures 31 in the motor casing 29 provide means by which the air can pass through that casing and by-pass the closure plate 4. Exit from the motor hood 3 is by means of the exhaust port 41 which, similarly to the intake port 22, is adapted to receive and seat the dusting tool hose 6. The air in passing through the motor casing 29 performs the important function of cooling that element.

The means which clean the final filter 34 comprise the nozzle 42 which is formed with a relatively narrow mouth which extends the full height of the filter 34. The intake opening of nozzle 42 can be a slot having a width in accordance with well known cleaner design practice. Nozzle 42 is rotatably mounted for movement in a circular orbit around the inner periphery of the cylindrical filter 34 by means of a conduit seat 43 which is rotatably supported concentrically of its downwardly-facing inlet 44 by means of a bearing 46 which is carried by the upwardly opening seat of conduit 47. The latter extends across the top of the fan chamber 12 and then down the side of the casing 8 to end within the valve inlet chamber 21 and adjacent the valve 23. Suitable seals 48 and 49 are provided to prevent air leakage around the vertical sleeve 51 which encloses and partially supports, as at the bearing 52, the motor shaft 32. The lower seal 48 also prevents leakage of air between the fan chamber 12 and the conduit 47.

Rotary movement is imparted to the filter-cleaning nozzle 42 by means of the speed-reducing and clutch mechanism positioned within the housing 54 immediately below the motor 29. The motor shaft 32 rotates at a speed much too high for direct connection to the filter-cleaning nozzle 42 and accordingly it is necessary that speed-reducing means be provided. Additionally, it is desired, according to the present invention, that the filter-cleaning nozzle operate only when necessary and this requires that means be provided to clutch and de-clutch the nozzle to and from the motor. The speed-reducing and clutch means comprise a plurality of gears and shafts. Motor shaft 32 itself carries a worm 56 within the sleeve 51 and immediately below motor 29. A transverse jack shaft 57, rotatable in bearings 58 positioned in brackets 59, carries a gear 61 which extends through a slot 62 in the sleeve 51 to mesh with the worm 56.

A second and vertical jack shaft extends transversely of jack shaft 57 and is indicated by the reference character 64. A gear 66 at the upper end of shaft 64 cooperates with the worm 67 carried by jack shaft 57. A gear 68 at the lower end of vertical jack shaft 64 is in turn adapted to cooperate with a large diameter gear 69 which encircles the sleeve 51 about the motor shaft, being rotatably seated thereon by bearing 71. Gear 69 is fixedly secured by means of a plurality of rivets 73 to the conduit seat 43 which carries the nozzle 42 and the entire construction is forced downwardly upon the bearing 46 by the coil spring 74 which encircles the sleeve 51 and exerts a downward force between a shoulder 76 on the sleeve 51 and the bearing 71. The ratio of the gears connecting the shaft 32 to the nozzle 42 is such that a material reduction in speed is obtained at the nozzle 42.

The clutching and de-clutching of the filter-cleaning nozzle 42 from the motor shaft 32 is accomplished by the following structure. The vertical jack shaft 64 is rotatably mounted in upper and lower bearings 77 which are carried by the parallel horizontal arms of a U-shaped bracket 78 which is slidably supported on the bottom face of chamber 54. The lower arm of the bracket is guided in its sliding movement by a pin 79 carried by the bottom wall which cooperates with a slot 81 in that arm while the upper arm is guided by a downwardly extending U-shaped guide member 82 which it contacts. A leaf spring 83 exerts a downward force upon the upper bracket arm at all times to hold it in any set position and to prevent accidental displacement. The jack shaft 64 is movable with its carrying bracket 78 between two positions, the direction of movement being parallel to the horizontal jack shaft 57 so that the gear 66 remains in contact with the worm 67 in all adjusted positions of shaft 64. In the position illustrated in Figures 2 and 3, the jack shaft 64 has been moved outwardly until the gear 68 is out of contact with the large gear 69 and consequently the filter-cleaning nozzle is stationary. Movement of the U-shaped bracket 78 to the right, as viewed in these figures, effects the movement of the constantly rotating shaft 64 and the gear 68 until the latter meshes with the large gear 69, at which time the latter is rotated.

To control the clutching and de-clutching of the filter-cleaning nozzle from the driving motor means are provided which are controlled by the back pressure existing within the filter chamber 33 according to this first embodiment of the invention. The actual movement of the gear-carrying bracket 78 into and out of engaging position is accomplished by means of an electrical solenoid 86, the movable plunger 87 of which engages the slotted end of an L-shaped lever arm 88 which is pivotally mounted at 89 upon a bracket 91. A torsion spring 92 at the pivotal axis of the arm 88 at all times exerts a pressure on that arm to hold it in the lower plunger position. The opposite end of the lever arm 88 is rounded and engages a slot seat formed therefor in the extended end of a shaft 93 which is fixedly connected to the bracket 78. The de-clutched position of the bracket 78 and of the shaft 93 is that shown in full lines in Figure 2, the torsion spring 92 exerting a force tending to hold the parts in this relationship. With the solenoid energized, however, the plunger 87 thereof is drawn upwardly, the arm 88 is pivoted counter-clockwise as viewed in Figure 2, and the shaft 93 is forced to the right and the gear 68 into mesh with the large gear 69.

Figure 1:
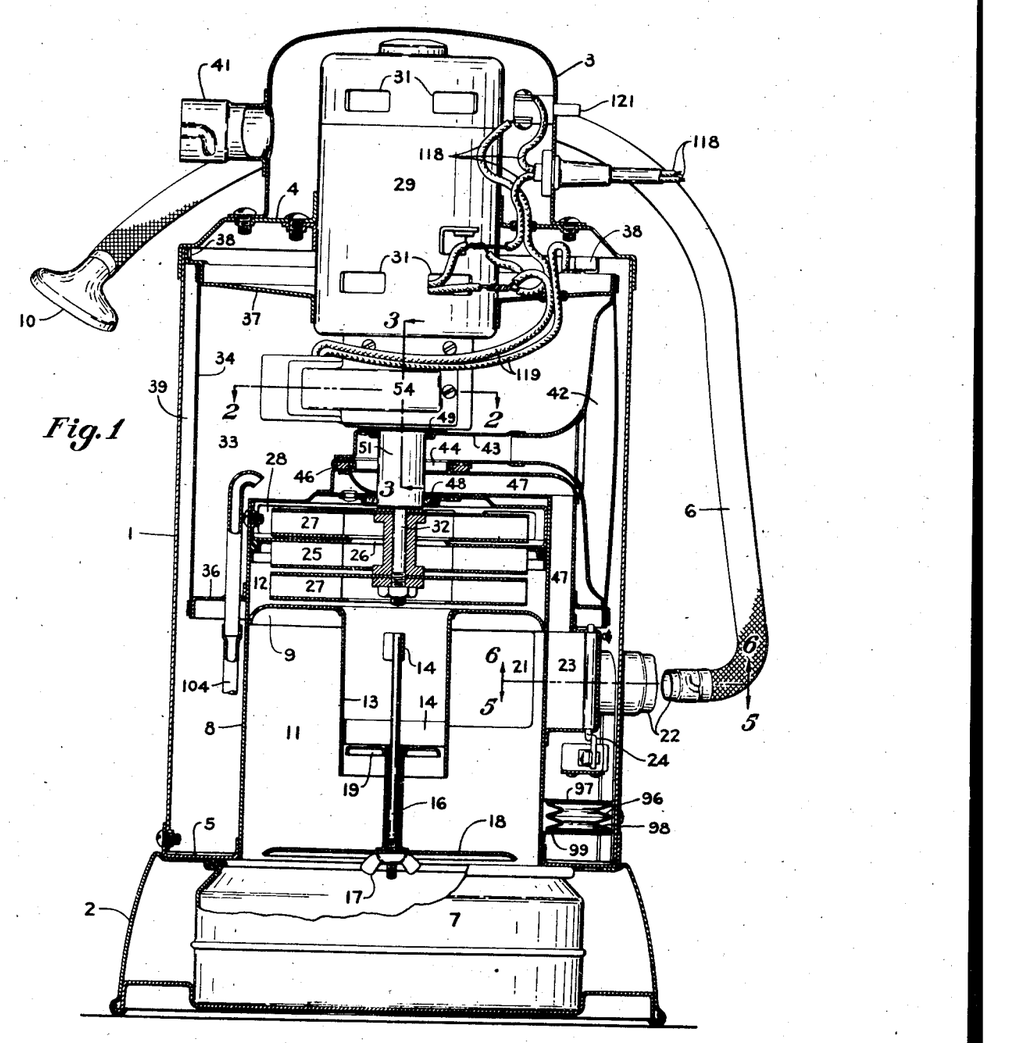
Figure 1 is a vertical section through a cleaner construction in accordance with the first embodiment of the invention.
Figures 2, 4:
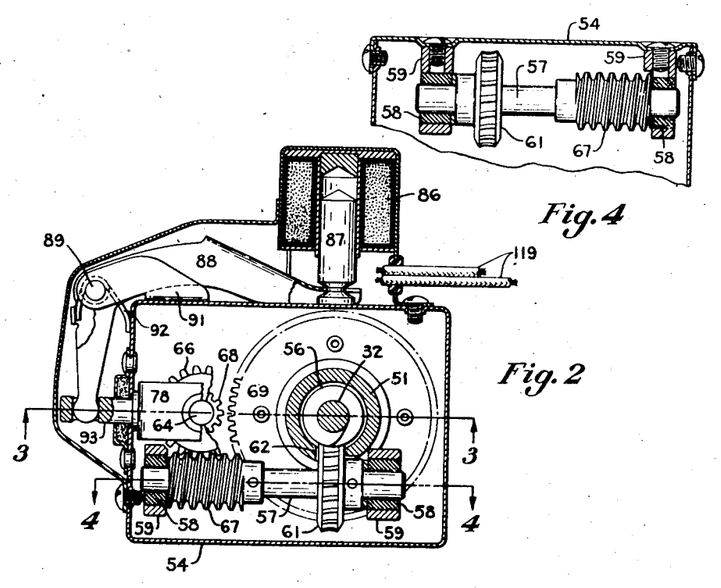
Figure 2 is a section through the power-transmitting and clutch means being taken upon the line 2—2 of Figure 1.
Figure 4 is a showing partly in section and upon the line 4—4 of Figure 2.
Figure 3:
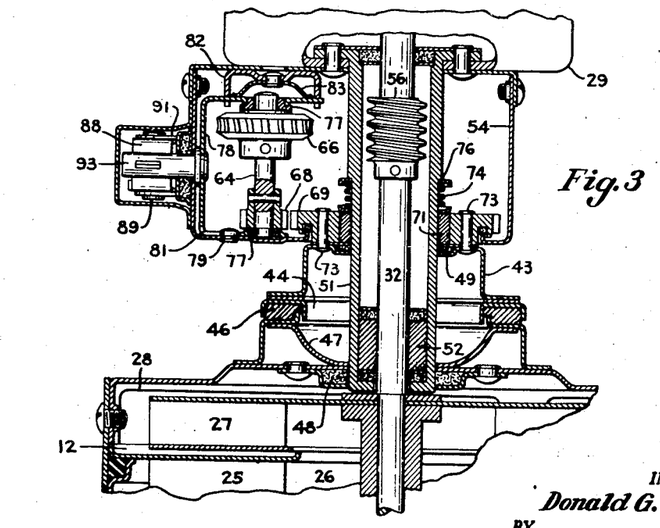
Figure 3 is a vertical partial section through the power-transmitting and clutch means, being taken upon the line 3—3 of Figure 2 and Figure 1.
Figures 5, 6, 7, 8, 9:
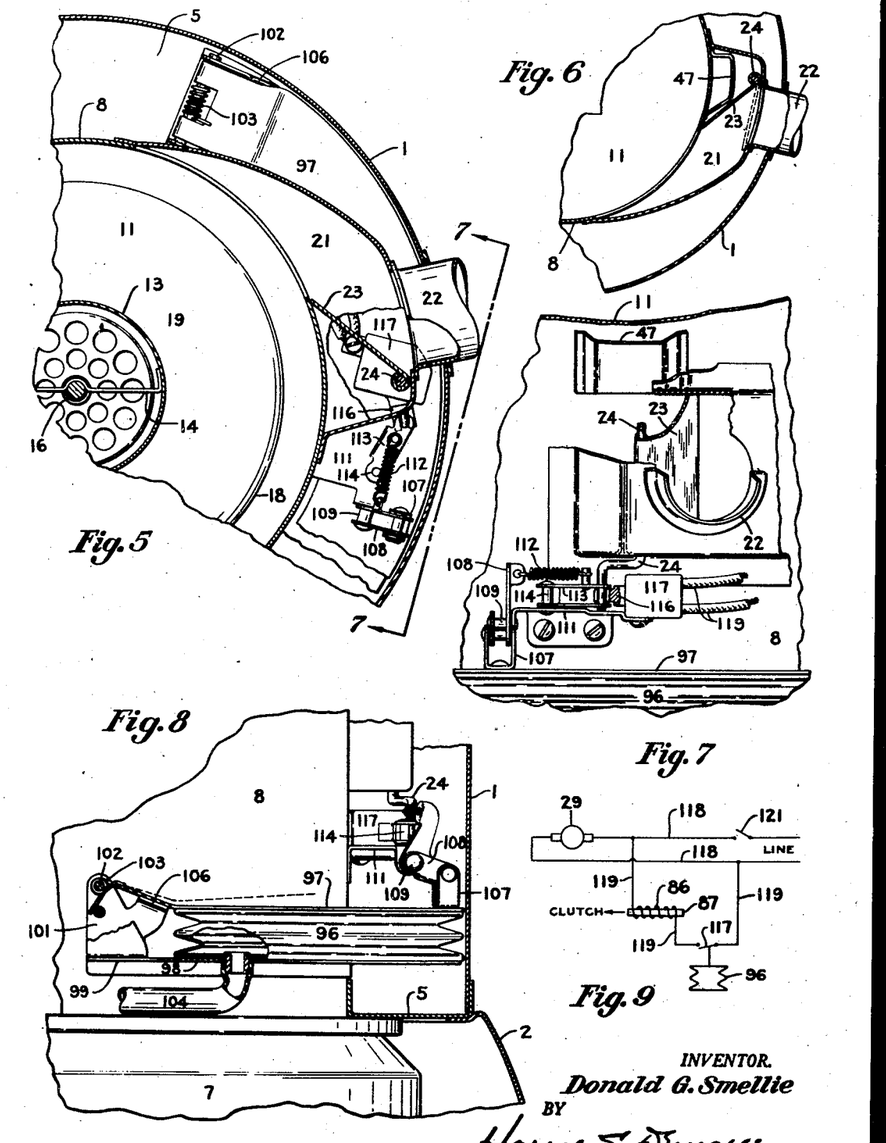
Figure 5 is a partial section through the cleaner looking in the direction of the arrows upon the line 5—5 of Figure 1 and shows the air flow-controlling valve in its normal operating position.
Figure 6 is a transverse partial section looking in the direction of the arrows upon the line 6—6 of Figure 1 and shows the air flow-controlling valve in its normal operating position and its relationship to the conduit leading to the filter-cleaning nozzle.
Figure 7 is a partial side view looking in the direction of the arrows upon the line 7—7 in Figure 5 with certain parts broken away and shown in section, and illustrates the valve-controlling mechanism and the inlet and valve relationship.
Figure 8 is a vertical interior view of the cleaner and shows the pressure-responsive bellows which actuates the valve-positioning mechanism and the clutch-solenoid-controlling electrical switch, the bellows being shown in full lines in the normal inoperative position and the dotted line illustrating the angle assumed by the bellows top plate when the back pressure in the final filter has increased to a point indicating the necessity for the filter-cleaning operation to begin.
Figure 9 is a diagrammatic showing of the electrical connections of the cleaner.

It is necessary that the filter-cleaning nozzle 42 be actuated and supplied with a moving air stream only when the physical condition of the filter 34 makes the cleaning action necessary. In accordance with the present invention means are provided which determine the existence of this condition, and upon finding it to be present, cause the actuation of the nozzle and the proper positioning of the air flow-controlling valve 23. This means comprises a pressure-responsive bellows which is indicated in the drawings by the reference character 96 and which is seen to comprise a flexible accordion-pleated air tight casing, of a material such as rubber, its top and bottom walls including the rigid plates 97 and 98, respectively. The lower plate 98 is fixedly carried by an outwardly extending shelf 99 fixedly attached to the lower end of the cylindrical wall 8, that is, adjacent the whirl chamber 11. Each end of the upper bellows wall 97 is pivotally mounted upon a bracket 101 which may be formed integrally with the shelf 99 or may be merely fixedly attached thereto. The connection between the plate 97 and each bracket 101 is by means of a pivot pin 102 and around each pin is a torsion spring 103 which at all times exerts a force to urge the plate 97 downwardly to collapse the bellows. Being pivotally mounted the top of the bellows, represented by the plate 97, is movable between a collapsed position, illustrated in full lines in Figure 3, and an expanded position which is illustrated diagrammatically by the dotted line in the same figure, one or more suitable stops 106 being formed on bracket 101 to limit the bellows movement. Expansion of the bellows takes place when the pressure therein is sufficient to overcome the resisting force of the torsion springs 103 and such pressure is present when the pressure within the filter chamber 33 has exceeded a predetermined point. The connection between the filter chamber and the bellows which provides the pressure of the former in the latter comprises an elongated tube or conduit 104 which, from its connection with the interior of the bellows 96, as illustrated in Figure 8, passes up the side of the cylindrical casing 8 and into the filter chamber 33 through the bottom wall 36 thereof, as shown in Figure 1. Conduit 104 is at all times open to the filter chamber 33 and it is clear that the air pressure which is present in that chamber will also be present within bellows 96.

To translate the movement of bellows 96 into the actuation of the nozzle-clutching means and the valve-operating means the bellows 96 carries an upwardly opening U-shaped bracket 107 to which pivotally connects the lower end of a bell crank lever 108 which is itself pivotally mounted centrally upon a pin 109 carried by a platform 111 attached to the outer surface of casing 8 in the manner of the shelf 99 but above the bellows 96. To the upper end of lever 108 is attached an elongated coil spring 112 which is connected at its opposite end to a snap lever 113 which is pivoted on the top surface of platform 111 by a vertical pivot pin 114. The pin 114 is so positioned relative to the travel of bell crank lever 108 that spring 112 moves over center with respect thereto in moving from the collapsed bellows position to the expanded bellows position. The opposite end of the pivoted lever 113 connects to the offset lower end of the valve shaft 24 which also extends through the pivoted operating lever 116 of a snap action switch 117 also carried by the platform 111. Valve 23 is illustrated in Figure 5 in its open port position with the bellows collapsed. With the bellows expanded and the bell crank lever 108 pivoted counter-clockwise, as viewed in Figure 8, it is clear that the valve 23 would be moved into port-closing position. In this position it opens to the interior of the whirl chamber 11 the lower end of the conduit 47 which connects to the filter-cleaning nozzle 42. Because of the movement of the spring 112 over-center with respect to lever 113 in the pivotal movement of the bell crank lever 108 it is clear that the operation of valve 23 and switch 117 will be characterized by a snap action.

The electrical switch 117 controls the clutch-actuating solenoid 86 through the conductors 119 which connect across the incoming power leads 118 to the driving motor 29, the flow of current therethrough being controlled by the motor-controlling switch 121.

The operation of the cleaner constructed in accordance with the first embodiment of the invention aforedescribed is as follows: Upon the operator closing the motor-controlling switch 121 the electric motor 29 rotates its shaft 32 and suction is created within the whirl chamber 11 by the high speed rotation of the fans 27. A dusting tool hose, which was previously attached to the inlet port 22 and which preferably has a cleaning nozzle 10 at the outer end thereof, conveys the dirt-laden air into the port 22, through the valve chamber 21, the valve 23 being in the open port position as illustrated in Figures 5 and 6, and the air enters the initial dirt separator or whirl chamber 11 tangentially. The foreign material or dirt is thrown outwardly and passes downwardly into the dirt pan 7 positioned below the whirl chamber 11 while the cleaned air is drawn upwardly through the inlet 13 into the first stage of the fan unit. The air is exhausted from the second stage of the fan unit into the final dirt separator or filter chamber 33 from which it passes outwardly through the air-permeable but dirt-impermeable filter element 34. Upon leaving the filter chamber 33 the air enters the discharge chamber 39 from which it is exhausted at the top of the casing 1 through the motor 29, there being inlet and discharge ports 31 provided which permit its passage through the motor casing. The filtered air passes into the atmosphere through the exhaust port 41 in the motor hood 3. Incidentally, should the user desire to use pressure rather than suction in the cleaning operation, the dusting tool hose would have been connected to this exhaust port 41 rather than to the inlet port 22.

The operator continues his cleaning operation and dirt-laden air passes through the machine as described, practically all of the foreign material being removed from the air within the initial separator but a very small fraction thereof escaping therefrom and being exhausted by the fan unit into the filter chamber 33 where it collects upon the filter element 34. After a considerable period of time the accumulated foreign material upon the filter will result in an increase in the back pressure, that is, in an increase in the resistance to the flow of air through the filter element. This increase in back pressure is, as previously stated, undesirable in that it decreases the flow of air into the machine and accordingly the cleaning effectiveness. If permitted to continue indefinitely, this increase in back pressure will in time render the machine completely inoperative. In order to prevent such an event it is desirable that the collected foreign material upon the filter 34 be removed before the back pressure increases unduly.

As the back pressure in the final dirt separator 33 increases the bellows 96 is expanded by the same pressure through being interiorly connected to chamber 33 by the conduit 104. As the bellows 96 expands its upper plate 97 moves upwardly being pivoted at its ends at 102. At a certain point in this upward movement, that is, when the bell crank lever 108 has been pivoted sufficiently to move the spring 112 over-center with respect to the pivotal axis 114 of the lever 113, the latter moves with a snap action to its other position and results in the movement of the valve 23 to its closing position with respect to the port 22. Simultaneously the electrical switch 117 which controls the electrical solenoid 86 is closed.

Upon the valve 23 being moved to the port-closing position, air can no longer enter the cleaner through the dusting tool hose and the entire suction of the device is made available to the filter-cleaning nozzle 42 through the conduit 47 which opens into the valve chamber 21 at the rear of the valve 23 in a position in which it is normally sealed from the whirl chamber. Air is now drawn into the filter-cleaning nozzle 42, passing inwardly from the discharge chamber 39 in the reverse of its normal direction of travel therethrough and passes through the filter element 34. From the nozzle 42 the air is drawn through the conduits 43 and 47 into the whirl chamber.

The electrical energization of the solenoid 86 upon the closing of switch 117 resulted in the upward movement of the plunger 87 which in turn caused the pivotal movement of the L-shaped lever 88 which in turn forced inwardly the shaft 93 connected to the bracket 78. The latter in its movement from the left to the right, as viewed in Figure 3, caused the small bracket-carried gear 68 to mesh with the large nozzle-connected gear 69. The little gear is at all times driven directly from the motor shaft 32 as previously described, and the result is that the large gear 69 now begins its rotation and with it rotates the nozzle-carrying conduit seat 43 which is fixedly connected thereto. The nozzle 42 now rotates within the filter chamber 33 around the motor shaft and in contact with the filter element 34 around its entire inner surface. As the nozzle 42 moves over the dirt-covered inner surface of the filter element 34 the foreign material thereon is drawn into the mouth of the nozzle 42 and is conveyed directly through the conduits 43 and 47 to the whirl chamber where it is removed, an agglomerating effect having taken place by the collection of the foreign material upon the filter element 34 so that the same foreign material which previously escaped from the whirl chamber is now removed therein. The fact that this agglomerated foreign material does not pass through the suction-creating fan unit on its way to the whirl chamber prevents the disintegration of the agglomerated material.

The cleaning operation of the final filter 34 continues until such time as the back pressure within the filter chamber 33 has decreased to a desirable degree. As the pressure within the filter chamber 33 and within the bellows 96 are the same any decrease in pressure in the chamber is immediately effective within the bellows and at a certain point the pressure tending to expand the bellows or to hold it expanded is overcome by the collapsing force exerted by the torsion springs 103 at the bellows' pivotal axes. The collapsing movement may be gradual or it may be in steps, but there arrives a certain point at which the collapse of the bellows has been sufficient to cause the spring 112 to move over-center again with respect to the pivotal axis 114 of the lever 113. When such time arrives, lever 113 is again snapped to its original position, valve 23 is again moved to open position, thereby closing the conduit 47 leading to the filter nozzle from the whirl chamber, and the inlet port 22 is again opened. The machine is then again in the normal operating relationship and the user can continue with his cleaning operation.

In due time it will be desirable to remove the foreign material which has then collected within the dirt pan 7. This can be done either by removing the pan 7 laterally from the side of the base 2 or by removing the upper part of the cleaner from the base and removing the pan therefrom as taught originally in the Bible Patent 2,247,472, depending upon the cleaner design.

Figure 10:
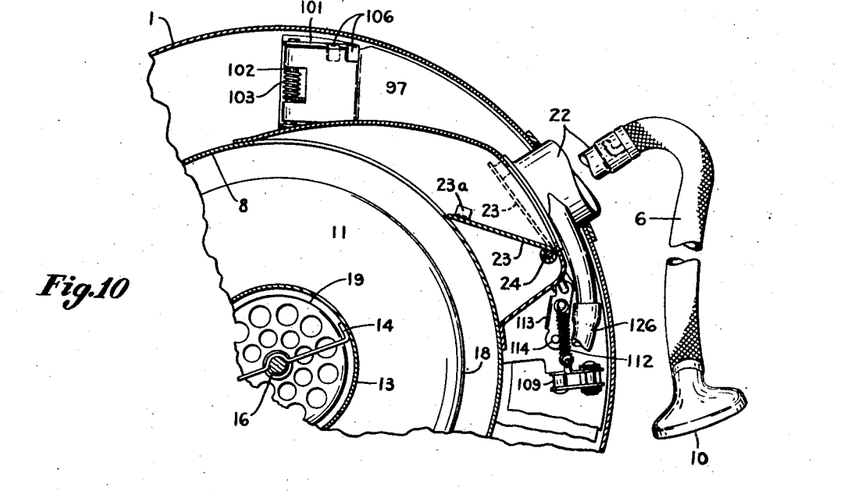
Figure 10 is a view similar to Figure 5 and illustrates a second preferred embodiment of the invention in which the suction or inlet side of the cleaner is connected to the control bellows rather than the high pressure side as in the first embodiment.
Figure 11:
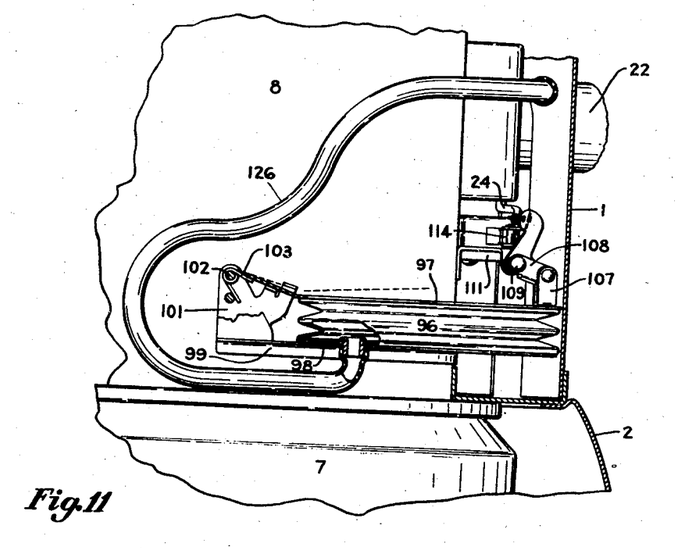
Figure 11 is a view similar to Figure 8 and illustrates the connection of the suction or inlet side of the cleaner to the control bellows which is positioned in the inoperative position in which the filter-cleaning nozzle is inoperative.

Referring now to Figures 10 and 11 the second preferred embodiment of the invention is illustrated in those details in which it differs from the first described embodiment. The major differences lie in the fact that the bellows 96 is here connected by means of a conduit 126 to the inlet port 22, whereas in the first embodiment the bellows was connected to the interior of the filter chamber. A second difference lies in the fact that the torsion springs 103 acting upon the bellows 96 in the first embodiment exerted a collapsing force thereon, whereas in this second embodiment the coil springs 103 are so arranged as to exert an expanding force. In other details of construction this embodiment is like the preceding one, with one exception. That exception comprises the tab 23a on the valve 23 which prevents the valve from completely sealing the port 22 when in the closing position.

This second embodiment of the invention operates as follows. In normal cleaner operation with the dusting tool nozzle 108 in contact with the surface undergoing cleaning the pressure within the inlet port 22 and so the pressure in the bellows 96, is sufficiently reduced to hold the bellows in a collapsed condition against the expanding force of the springs 103. Should the dusting tool nozzle be lifted for any reason the pressure within the inlet port 22 immediately increases and the suction in the bellows 96 is no longer sufficient to hold the bellows collapsed against the expanding force of springs 103. Thereupon the bellows expand closing the control switch 117 and moving the valve 23 to the port-closing position illustrated in dotted lines in Figure 10. As the valve 23 is provided with the small tab 23a it is prevented from sealing completely the inlet 22 so that at all times during cleaner operation there is a partial suction present within the inlet 22 and so within the dusting tool hose attached thereto, a sufficient suction to evacuate the air therefrom in the event that the nozzle is again placed in sealing relationship with a surface to be cleaned. So long as the nozzle is held out of sealing contact with a surface the valve 23 is held in the port-closing position, and the entire suction of the machine is effective to draw air through the filter-cleaning nozzle, which is rotated as in the first embodiment of the invention as above described, in the filter-cleaning operation. Upon the main nozzle being again placed in sealing contact with a surface undergoing cleaning, however, the air in the dusting tool hose and in the inlet port 22 is evacuated, the suction within the inlet port is reduced, and the bellows 96 is collapsed against the opposition of the spring 103. The collapse effects the snap action of the actuating mechanism controlling the valve and the electrical switch 117 and the filter-cleaning nozzle is placed out of operation and the valve 23 is moved to open position with respect to the port 22.

I claim:

1. A vacuum cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, dirt-removing means to remove foreign material from said final separator, air-conducting means to connect said dirt-removing means to said preliminary dirt separator for collection of said foreign material therein, valve means to control selectively the flow of air through said inlet port and through said air-conducting means, pressure-responsive means to actuate said valve means, and air-conducting means to connect said pressure-responsive means to a point of air flow in said cleaner.

2. A vacuum cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, dirt-removing means to remove foreign material from said final separator, air-conducting means to connect said dirt-removing means to said preliminary dirt separator for collection of foreign material therein, valve means to control selectively the flow of air through said inlet port and through said air-conducting means, pressure-responsive means to actuate said valve means, and air-conducting means to connect said pressure-responsive means to said final separator.

3. A vacuum cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, dirt-removing means to remove foreign material from said final separator, air-conducting means to connect said dirt-removing means to said preliminary dirt separator for collection of said foreign material therein, valve means to control selectively the flow of air through said inlet port and through said air-conducting means, pressure-responsive means to actuate said valve means, and air-conducting means to connect said pressure-responsive means to said inlet port.

4. A suction cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, a driving motor for said suction-creating means, movable dirt-removing means to remove foreign material from said final separator, air-conducting means to connect said dirt-removing means to said preliminary separator for collection of said foreign material therein, clutch means to connect said dirt-collecting means to said motor, valve means to control selectively the flow of air through said inlet port and through said air-conducting means, and pressure-responsive means connected to a point of air flow in said cleaner to control said clutch means and said valve means.

5. A suction cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, a driving motor for said suction-creating means, movable dirt-removing means to remove foreign material from said final separator, air-conducting means to connect said dirt-removing means to said preliminary separator, clutch means to connect said dirt-collecting means to said motor, valve means to control selectively the flow of air through said inlet port and through said air-conducting means, pressure-responsive means to control said clutch means and said valve means, and air-conducting means to connect said pressure-responsive means to said final separator.

6. A suction cleaner having an inlet port for dirt-laden air, a preliminary dirt separator, suction-creating means connected to said preliminary separator to draw air therethrough, a final dirt separator of the type in which the back pressure increases with the collection of dirt connected to said suction-creating means to receive air exhausted therefrom, a driving motor for said suction-creating means, movable dirt-removing means to remove foreign material from said final separator, air-conducting means to connect said dirt-removing means to said preliminary separator, clutch means to connect said dirt-collecting means to said motor, valve means to control selectively the flow of air through said inlet port and through said air-conducting means, pressure-responsive means to control said clutch means and said valve means, and air-conducting means to connect said pressure-responsive means to said inlet port.

7. A suction cleaner having an inlet port for dirt-laden air, a preliminary dirt separator, suction-creating means connected to said preliminary separator to draw air therethrough, a final dirt separator including a filter connected to said suction-creating means to receive air exhausted therefrom, a driving motor connected to said suction-creating means, dirt-removing means movable over the dirt-collecting surface of said filter to dislodge and to remove foreign material from said final separator, air-conducting means to connect said dirt-removing means directly to said preliminary separator positioned for operation at all times during cleaner operation, clutch means to connect said dirt-removing means to said motor said suction-creating means remaining connected thereto, pressure-responsive means to control said clutch means, and air-conducting means to connect said pressure-responsive means to a point of variable pressure in said cleaner.

8. A suction cleaner having an inlet port for dirt-laden air, a preliminary dirt separator, suction-creating means connected to said preliminary separator to draw air therethrough, a final dirt separator including a filter connected to said suction-creating means to receive air exhausted therefrom, a driving motor connected to said suction-creating means, dirt-removing means movable over the dirt-collecting surface of said filter to dislodge dirt therefrom to remove foreign material from said final separator, air-conducting means positioned at all times to connect said dirt-removing means to said preliminary separator to convey dirt from the former to the latter, clutch means to connect said dirt-removing means to said motor said suction-creating means remaining connected thereto, pressure-responsive means operative during cleaner operation to control said clutch means, and air-conducting means to connect said pressure-responsive means to said final separator.

9. A suction cleaner having an inlet port for dirt-laden air, a preliminary dirt separator, suction-creating means connected to said preliminary separator to draw air therethrough, a final dirt separator including a filter connected to said suction-creating means to receive air exhausted therefrom, a driving motor connected to said suction-creating means, a dirt-removing nozzle movable over the dirt-collecting surface of said filter to remove foreign material from said final separator, air-conducting means to connect said dirt-removing nozzle to said preliminary separator, clutch means to connect said dirt-removing nozzle to said motor said suction-creating means remaining connected thereto, pressure-responsive means to control said clutch means, and air-conducting means to connect said pressure-responsive means to said inlet port.

10. A vacuum cleaner having an inlet port for dirt-laden air, a preliminary dirt separator, suction-creating means connected to said preliminary separator to draw air therethrough, a final dirt separator of the type in which back pressure increases with the collection of dirt connected to said suction-creating means to receive air exhausted therefrom, dirt-removing means to remove foreign material from said final separator, air-conducting means to connect said dirt-removing means to said preliminary dirt separator, valve means to control selectively the flow of air through said inlet port and through said air-conducting means, means to determine the presence of an excessive amount of dirt in said final separator making cleaning desirable, and means controlled by said last-mentioned means to actuate said dirt-removing means and to move said valve means to inlet-port-closing position to make the reduced pressure in said preliminary separator effective in said air-conducting means.

11. In a suction cleaner, a main cleaning nozzle, an initial dirt separator connected to said nozzle, a final dirt separator, a cleaning nozzle for said final separator, suction-creating means to move air through said nozzles and separators, valve means controlling and dividing the flow of air to said suction-creating means between said nozzles, fluid-pressure-operated means to ascertain the flow of air through said main nozzle, and means connecting said fluid-pressure-operated means to said valve means to move the latter to reduce the flow of air through said main nozzle upon said flow of air therethrough exceeding a predetermined rate and to increase the flow of air through said cleaning nozzle.

12. A suction cleaner having an inlet port for dirt-laden air, a main cleaning nozzle connected thereto and through which cleaning air enters at a rate variable with the contact of the nozzle with a surface being cleaned, a preliminary separator connected to said inlet port, suction-creating means connected to said preliminary separator to draw air therethrough, a final dirt separator connected to said suction-creating means to receive air exhausted therefrom, a driving motor for said suction-creating means, movable dirt-removing means to remove foreign material from said final separator, air-conducting means not including said suction-creating means to connect said dirt-removing means to said preliminary separator, and means to move said dirt-removing means relative to said final separator and over the filtering surface thereof including means controlled by variations in air pressure on the inlet side of said preliminary separator.

13. A vacuum cleaner having an inlet for dirt-laden air, a dirt separator for said dirt-laden air of the type in which the back pressure increases with the collection of dirt, suction-creating means to move said air through said inlet and separator, a cleaning nozzle for said separator, air-conducting means to connect said nozzle to a point of suction created by said suction-creating means to move a cleaning air stream therethrough, air-flow-controlling means controlling the flow of air through said inlet for dirt-laden air and through said air-conducting means, and pressure-operated means responsive to pressure in said separator controlling said air-flow-controlling means and adapted to reduce the flow of air through said inlet and to effect a flow of air through said air-conducting means in the presence of a predetermined pressure in said separator.

14. A vacuum cleaner having an inlet for dirt-laden air, a dirt separator for said dirt-laden air of the type in which the back pressure increases with the collection of dirt, suction-creating means including a motor to move said air through said inlet and separator, a movable cleaning nozzle for said separator, air-conducting means to connect said nozzle to a point of suction created by said suction-creating means to move a cleaning air stream therethrough, air-flow-controlling means controlling the flow of air through said inlet for dirt-laden air and through said air-conducting means, power-transmission means including clutch means to connect said nozzle to said motor, and pressure-operated means responsive to pressure in the stream of air moved by said suction-creating means to close said clutch means to drive said nozzle and to actuate said air-flow-controlling means to reduce the flow of air through said inlet and to effect a flow of air through said air-conducting means and said nozzle for the purpose of removing dirt from said separator, and a dirt receptacle for the dirt removed by said nozzle.

15. In a suction cleaner, surface-cleaning means, an initial dirt separator connected to said surface-cleaning means, a final dirt separator, cleaning means to clean said final dirt separator, suction-creating means to move air through both of said cleaning means and both of said dirt separators, valve means to control the flow of air through both of said cleaning means, and fluid-pressure-operated means connected to said valve means and having an opening exposed to the air pressures passing through said final separator to operate under predetermined air pressures in said final separator for actuating said valve means to reduce the flow of air passing through said surface-cleaning means.

DONALD G. SMELLIE.